US012083558B2

(12) United States Patent
Kojima

(10) Patent No.: US 12,083,558 B2
(45) Date of Patent: Sep. 10, 2024

(54) ULTRASONIC DEVICE TO SUPPRESS INFLUENCE OF CROSSTALK BETWEEN CHANNELS

(71) Applicant: SEIKO EPSON CORPORATION, Tokyo (JP)

(72) Inventor: Chikara Kojima, Matsumoto (JP)

(73) Assignee: SEIKO EPSON CORPORATION, Tokyo (JP)

( * ) Notice: Subject to any disclaimer, the term of this patent is extended or adjusted under 35 U.S.C. 154(b) by 678 days.

(21) Appl. No.: 17/106,433

(22) Filed: Nov. 30, 2020

(65) Prior Publication Data

US 2021/0162463 A1 Jun. 3, 2021

(30) Foreign Application Priority Data

Nov. 29, 2019 (JP) ................................ 2019-216434

(51) Int. Cl.
*B06B 1/06* (2006.01)

(52) U.S. Cl.
CPC .................................. *B06B 1/0629* (2013.01)

(58) Field of Classification Search
CPC .................................................... B06B 1/0629
USPC ......................................................... 310/334
See application file for complete search history.

(56) References Cited

U.S. PATENT DOCUMENTS

2008/0024563 A1* 1/2008 Matsui ................. H10N 30/076 310/365
2008/0048211 A1* 2/2008 Khuri-Yakub ...... H01L 27/1203 257/E27.07
2008/0087090 A1 4/2008 Watanabe et al.
2009/0184297 A1* 7/2009 Moriyama ........... C09D 11/322 252/582
2015/0258573 A1 9/2015 Kojima
2017/0179365 A1* 6/2017 Yonemura ............. B06B 1/0622
2018/0192995 A1* 7/2018 Osawa ................. A61B 8/4494
2022/0160331 A1* 5/2022 Ohashi ................ A61B 8/4427

FOREIGN PATENT DOCUMENTS

JP 2008099103 A 4/2008

* cited by examiner

*Primary Examiner* — Emily P Pham
*Assistant Examiner* — Monica Mata
(74) *Attorney, Agent, or Firm* — Pramod Chintalapoodi

(57) ABSTRACT

An ultrasonic device includes a substrate having a plurality of opening parts and a wall, a vibrating plate closing the opening parts, and vibrators provided to the vibrating plate, wherein the plurality of opening parts includes a first opening part, a second opening part adjacent to the first opening part via a first wall, and a third opening part adjacent to the first opening part via a second wall, a first vibrating section closing the first opening part and the vibrator constitute a first ultrasonic transmitter, a second vibrating section closing the second opening part and the vibrator constitute an ultrasonic receiver, a third vibrating section closing the third opening part and the vibrator constitute a second ultrasonic transmitter, and the wall width of the first wall is larger than the wall width of the second wall.

2 Claims, 7 Drawing Sheets

ULTRASONIC DEVICE TO SUPPRESS INFLUENCE OF CROSSTALK BETWEEN CHANNELS

The present application is based on, and claims priority from JP Application Serial Number 2019-216434, filed Nov. 29, 2019, the disclosure of which is hereby incorporated by reference herein in its entirety.

BACKGROUND

1. Technical Field

The present disclosure relates to an ultrasonic device.

2. Related Art

In the past, there has been known an ultrasonic device for transmitting/receiving an ultrasonic wave (e.g., JP-A-2008-99103 (Document 1)). The ultrasonic device in Document 1 is provided with a receiving member and a plurality of receiving elements fixed to the receiving member. The receiving member has a plurality of receiving areas, and between these receiving areas, there are formed shield sections (concave grooves). Thus, the crosstalk between the receiving areas adjacent to each other is prevented. Further, receiving elements independent of each other are respectively disposed in the receiving areas.

However, in the ultrasonic device of Document 1, there is a problem that the strength is weakened at the formation positions of the concave grooves in the receiving member. Further, since there is adopted the configuration in which the concave groove is disposed between the receiving areas adjacent to each other, and at the same, the receiving elements independent of each other are respectively disposed in the receiving areas, there is a problem that the configuration also becomes complicated.

SUMMARY

An ultrasonic device according to a first aspect includes a substrate having a plurality of opening parts, and a wall disposed between the opening parts adjacent to each other, a vibrating plate configured to close the opening parts, and vibrators provided to the vibrating plate at positions overlapping the opening parts when viewed from a stacking direction of the substrate and the vibrating plate, wherein the plurality of opening parts includes a first opening part, a second opening part adjacent to the first opening part via a first wall, and a third opening part adjacent to the first opening part via a second wall, a first vibrating section configured to close the first opening part in the vibrating plate and the vibrator disposed in the first vibrating section constitute a first ultrasonic transmitter configured to transmit an ultrasonic wave, a second vibrating section configured to close the second opening part in the vibrating plate and the vibrator disposed in the second vibrating section constitute an ultrasonic receiver configured to receive an ultrasonic wave, a third vibrating section configured to close the third opening part in the vibrating plate and the vibrator disposed in the third vibrating section constitute a second ultrasonic transmitter configured to transmit an ultrasonic wave, and a width of the first wall from the first opening part to the second opening part is larger than a width of the second wall from the first opening part to the third opening part.

An ultrasonic device according to a second aspect includes a vibrating plate, a protective member having a protruding part bonded to the vibrating plate and configured to divide the vibrating plate into a plurality of vibrating sections, and vibrators disposed in the respective vibrating sections of the vibrating plate, wherein the plurality of vibrating sections includes a fourth vibrating section, a fifth vibrating section adjacent to the fourth vibrating section via a first protruding part, and a sixth vibrating section adjacent to the fourth vibrating section via a second protruding part, the fourth vibrating section and the vibrator disposed in the fourth vibrating section constitute a third ultrasonic transmitter configured to transmit an ultrasonic wave, the fifth vibrating section and the vibrator disposed in the fifth vibrating section constitute an ultrasonic receiver configured to receive an ultrasonic wave, the sixth vibrating section and the vibrator disposed in the sixth vibrating section constitute a fourth ultrasonic transmitter configured to transmit an ultrasonic wave, and a width of the first protruding part from the fourth vibrating section to the fifth vibrating section is larger than a width of the second protruding part from the fourth vibrating section to the sixth vibrating section.

DESCRIPTION OF AN EXEMPLARY EMBODIMENT

An embodiment of the present disclosure will hereinafter be described.

Figure 1:
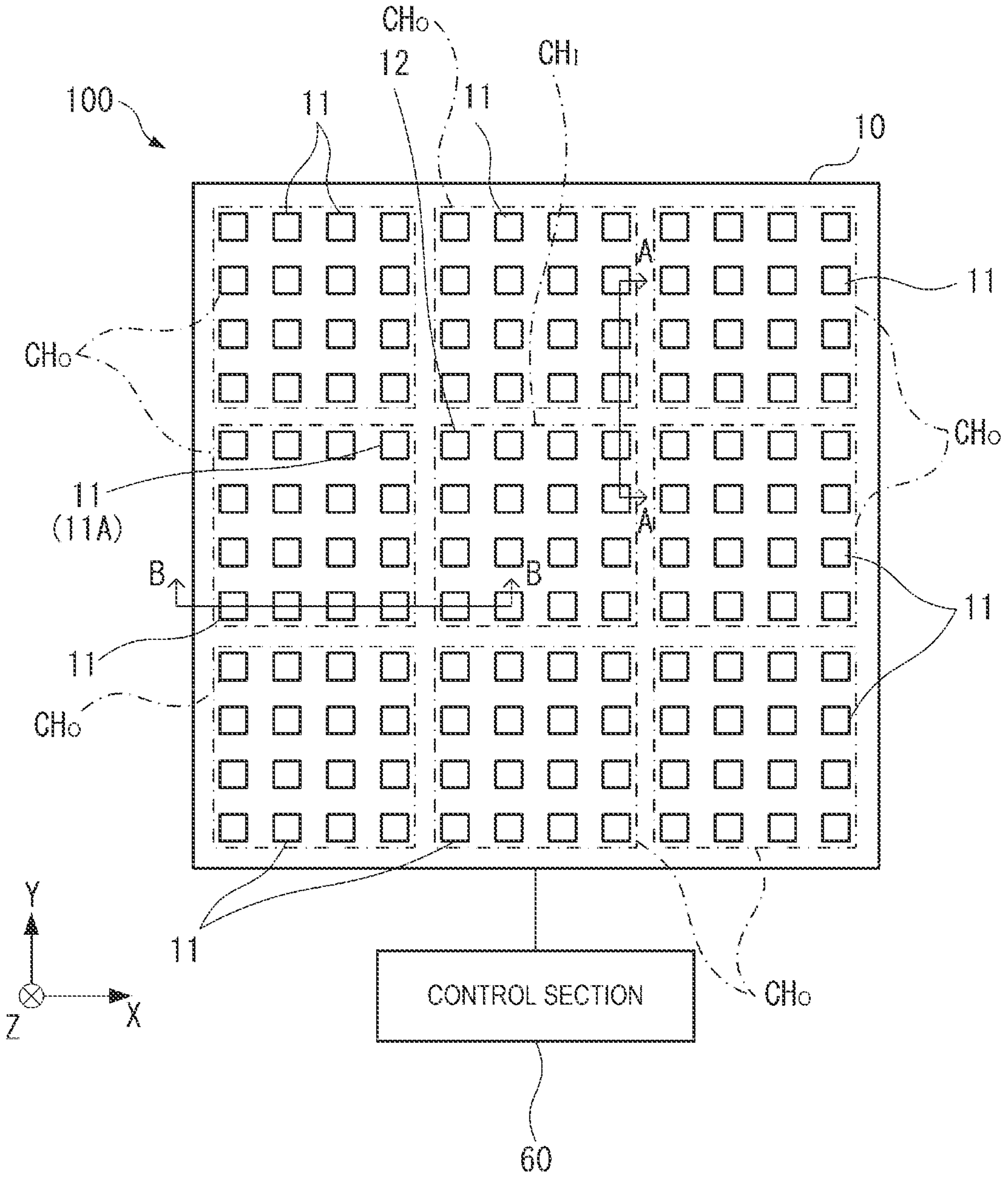
FIG. 1 is a diagram showing a schematic configuration of an ultrasonic apparatus according to an embodiment.

FIG. 1 is a diagram showing a schematic configuration of an ultrasonic apparatus 100 according to the present embodiment.

As shown in FIG. 1, the ultrasonic apparatus 100 is configured including an ultrasonic device 10 and a control device 60.

Such an ultrasonic apparatus 100 can be used as a range sensor and a thickness detection sensor by transmitting an ultrasonic wave from the ultrasonic device 10 to an object not shown, and then receiving the ultrasonic wave reflected by the object. For example, when using the ultrasonic apparatus 100 as the range sensor, the control section 60 measures the time from a transmission timing of the ultrasonic wave from the ultrasonic device 10 to a reception timing when the ultrasonic wave reflected by the object is received by the ultrasonic device 10. Thus, the control section 60 calculates the distance of the object from the ultrasonic device 10 based on the time thus measured and the known speed of sound. Further, when using the ultrasonic apparatus 100 as the thickness detection sensor, the control section 60 transmits an ultrasonic wave from the ultrasonic device 10 to the object, and then measures the sound pressure of the ultrasonic wave reflected by the object and then received by the ultrasonic device 10. Thus, it is possible for the control section 60 to detect the thickness of the object and overlap of the object based on the sound pressure.

Constituents of such an ultrasonic apparatus 100 will hereinafter be described.

Configuration of Ultrasonic Device 10

Figure 2:
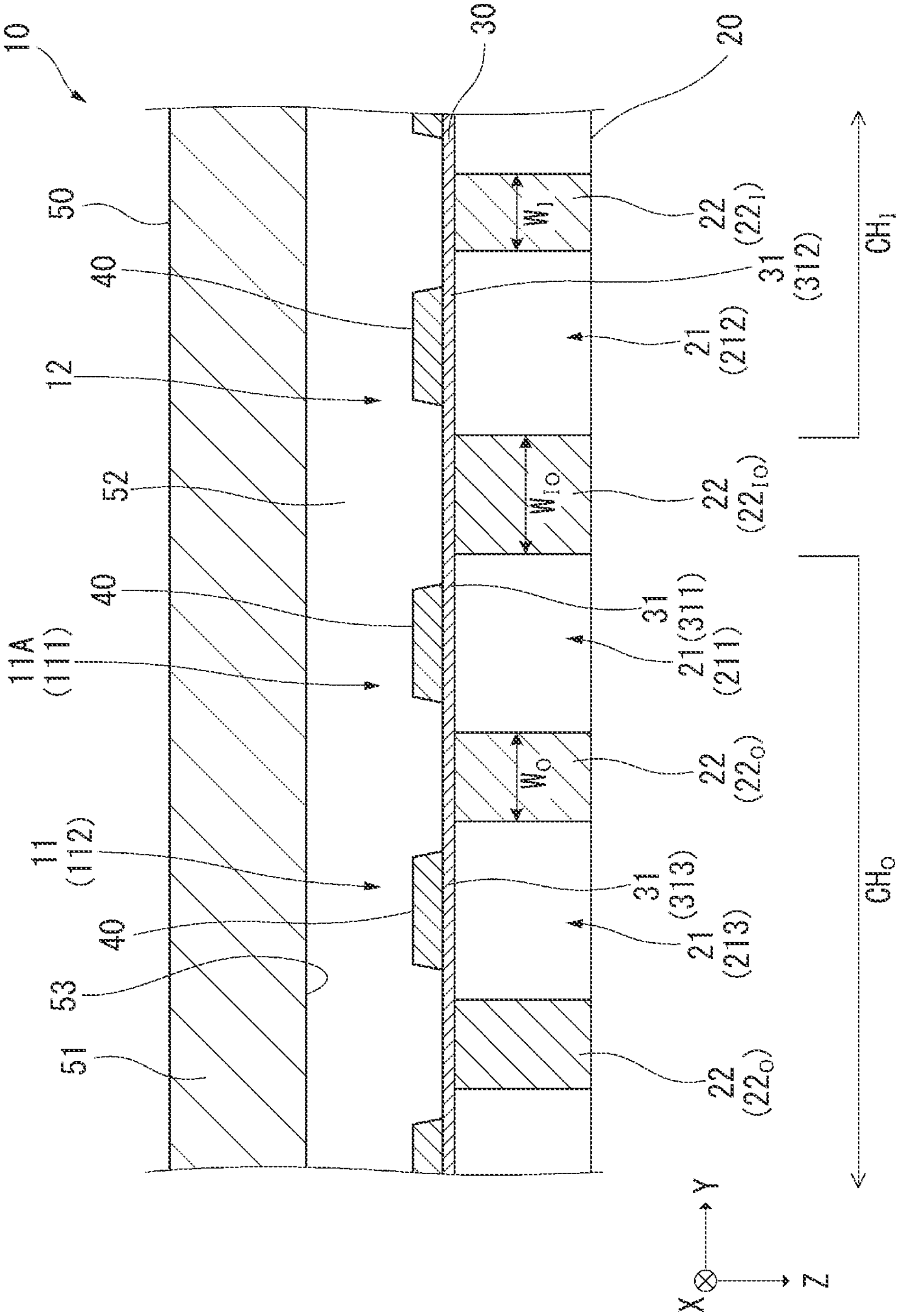
FIG. 2 is a cross-sectional view of an ultrasonic device cut along the line A-A shown in FIG. 1.
Figure 3:
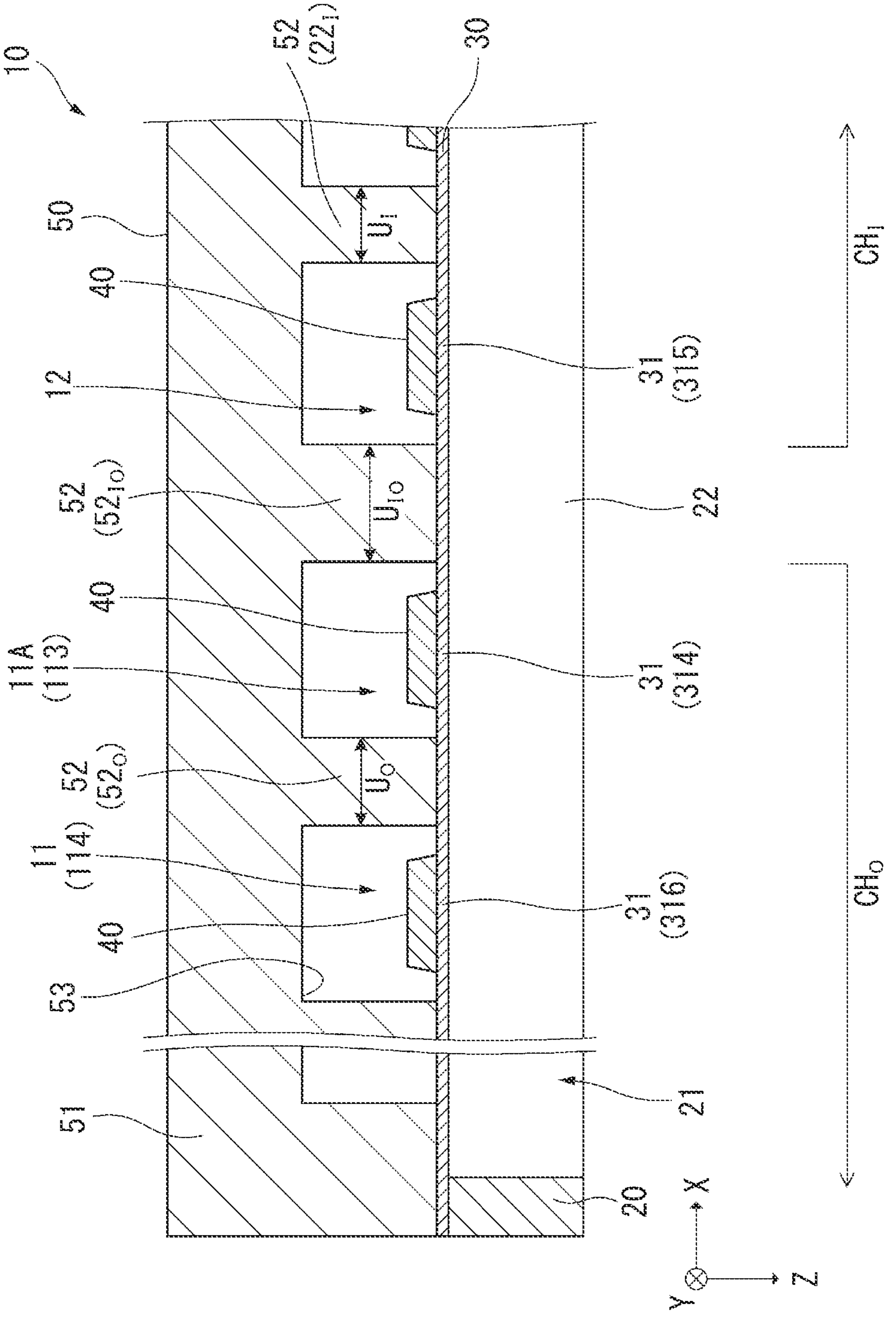
FIG. 3 is a cross-sectional view of the ultrasonic device cut along the line B-B shown in FIG. 1.

FIG. 2 is a cross-sectional view of the ultrasonic device 10 cut along the line A-A shown in FIG. 1. FIG. 3 is a cross-sectional view of the ultrasonic device 10 cut along the line B-B shown in FIG. 1.

As shown in FIG. 1, the ultrasonic device 10 is provided with transmission channels $CH_O$ for transmitting the ultrasonic wave, and a reception channel $CH_I$ for receiving the ultrasonic wave. In the present embodiment, there are disposed eight transmission channels $CH_O$ around the reception channel $CH_I$. Each of the channels is an element group to be driven individually. For example, one transmission channel $CH_O$ includes a plurality of ultrasonic transmitters 11 arranged in a two-dimensional array structure. By signal lines of these ultrasonic transmitters 11 being coupled to each other, it becomes possible to simultaneously drive the ultrasonic transmitters 11 included in one transmission channel $CH_O$. In other words, in the ultrasonic device according to the present embodiment, it becomes possible to drive the eight transmission channels $CH_O$ independently of each other.

The same applies to the reception channel $CH_I$, and the reception channel $CH_I$ includes a plurality of ultrasonic receivers 12 arranged in a two-dimensional array structure.

As shown in FIG. 2 and FIG. 3, the ultrasonic device 10 is configured including a substrate 20, a vibrating plate 30 stacked on the substrate 20, piezoelectric elements 40 (vibrators) provided to the vibrating plate 30, and a protective member 50 for covering the substrate 20, the vibrating plate 30, and the piezoelectric elements 40. Here, a stacking direction from the protective member 50 toward the vibrating plate 30 and the substrate 20 is defined as a Z direction. Further, a direction perpendicular to the Z direction is defined as an X direction, and a direction perpendicular to the X direction and the Z direction is defined as a Y direction.

As shown in FIG. 2 and FIG. 3, the substrate 20 is a member for supporting the vibrating plate 30, and is formed of a semiconductor substrate made of Si or the like. The substrate 20 is provided with a plurality of opening parts 21 penetrating along the Z direction. The opening parts 21 are each formed so as to elongate in the X direction as shown in FIG. 3, and are arranged along the Y direction as shown in FIG. 2. In other words, in the substrate 20, between the opening parts 21 adjacent to each other in the Y direction, there is disposed a wall 22.

It should be noted that the wall width and the wall length of each of the walls 22 will be described later.

The vibrating plate 30 is formed of, for example, stacked body made of $SiO_2$ and $ZrO_2$. The vibrating plate 30 is supported by the substrate 20, and closes the −Z side of the opening part 21.

The protective member 50 is a member which is bonded to a surface at the opposite side to the substrate 20 of the vibrating plate 30 to reinforce the substrate 20 and the vibrating plate 30. The protective member 50 is provided with a base part 51 shaped like a substrate, and protruding parts 52 protruding from the base part 51 toward the vibrating plate 30.

The protruding parts 52 are each formed so as to elongate in the Y direction as shown in FIG. 2, and are arranged along the X direction as shown in FIG. 3. The protruding tip of the protruding part 52 is bonded to the vibrating plate 30 with a bonding member such as silicone. In other words, the base part 51 and the protruding parts 52 form recessed parts 53.

It should be noted that in FIG. 3, there is shown an example in which the base part 51 and the protruding parts 52 have an integral configuration, but it is also possible to adopt a configuration in which the base part 51 and the protruding parts 52 are separate members, and the protruding parts 52 are bonded to the base part 51.

In such a configuration, in the vibrating plate 30, an area overlapping the opening part 21 when viewed from the Z direction is zoned by the plurality of protruding parts 52 into a plurality of areas. In other words, in the vibrating plate 30, the vibrating sections 31 are each formed by an area surrounded by edges (edges of the walls 22) of the opening parts 21, and edges of the protruding parts 52.

As described above, in the present embodiment, the plurality of opening parts 21 each elongating in the X direction is arranged along the Y direction, and the plurality of protruding parts 52 each elongating in the Y direction is arranged along the X direction. Therefore, these vibrating sections 31 line in the X direction and the Y direction, and are arranged in a two-dimensional array structure. In other words, the transmission channels $CH_O$ and the reception channel $CH_I$ each have the vibrating sections 31 arranged in a two-dimensional array structure in which the vibrating sections 31 line in the X direction and the Y direction. Further, the vibrating sections 31 arranged along the X direction in one transmission channel $CH_O$ and the vibrating sections 31 arranged along the X direction in another transmission channel $CH_O$ adjacent to this transmission channel $CH_O$ line along the X direction. Similarly, the vibrating sections 31 arranged along the X direction in one transmission channel $CH_O$ and the vibrating sections 31 arranged along the X direction in the reception channel $CH_I$ adjacent to this transmission channel $CH_O$ line along the X direction. The same applies to the Y direction.

The piezoelectric elements 40 are respectively disposed with respect to the vibrating sections 31 of the vibrating plate 30. The piezoelectric elements 40 are each a vibrator for vibrating the vibrating section 31. Although the illustration of the detailed configuration of the piezoelectric element 40 is omitted, the piezoelectric element 40 is configured by, for example, stacking a lower part electrode, a piezoelectric film, and an upper part electrode in sequence on the vibrating plate 30. Further, the signal lines are coupled to the respective lower part electrodes and the respective upper part electrodes. These signal lines are electrically coupled to the control section 60 via terminal parts provided to the vibrating plate 30, and thus, due to the control from the control section 60, the transmission channels $CH_O$ and the reception channel $CH_I$ are driven.

Here, one vibrating section 31 in the transmission channel $CH_O$ and the piezoelectric element 40 disposed on that vibrating section 31 constitute one ultrasonic transmitter 11. Further, one vibrating section 31 in the reception channel $CH_I$ and the piezoelectric element 40 disposed on that vibrating section 31 constitute one ultrasonic receiver 12.

The lower part electrodes of the plurality of ultrasonic transmitters 11 arranged in the same transmission channel $CH_O$ are coupled to each other with the signal lines. Similarly, the upper part electrodes of the plurality of ultrasonic transmitters 11 arranged in the same transmission channel $CH_O$ are coupled to each other with the signal lines. Thus, by, for example, inputting a bias signal to the signal lines to be coupled to the lower part electrodes, and inputting a drive signal to the signal lines to be coupled to the upper part electrodes, it becomes possible to simultaneously drive the ultrasonic transmitters 11 included in one transmission channel $CH_O$. In other words, by applying a voltage between the lower part electrode and the upper part electrode in the piezoelectric element of each of the ultrasonic transmitters 11, the piezoelectric film expands or contracts, and thus, the vibrating section 31 vibrates with an oscillation frequency corresponding to the opening width and so on of the opening part 21. Thus, the ultrasonic wave is transmitted from the transmission channel $CH_O$ toward the +Z side.

Further, the lower part electrodes of the plurality of ultrasonic receivers 12 arranged in the reception channel $CH_I$ are coupled to each other with the signal lines, and the upper part electrodes of the plurality of ultrasonic receivers 12 arranged in the reception channel $CH_I$ are coupled to each other with the signal lines. Thus, when the ultrasonic wave is received by the reception channel $CH_I$, the vibrating section 31 of each of the ultrasonic receivers 12 vibrates, and a potential difference is generated between the lower part electrode side of the piezoelectric film and the upper part electrode side thereof. Therefore, a reception signal having a signal voltage corresponding to the potential difference is output from the reception channel $CH_I$, and it is possible for the control section 60 to detect the signal of the ultrasonic wave.

Configuration of Control Section 60

The control section 60 is provided with, for example, a drive circuit for driving the ultrasonic device 10, and a control circuit for controlling an overall operation of the ultrasonic apparatus 100.

The drive circuit is provided with, for example, a transmission circuit for outputting drive signals (voltage signals) to be output to the transmission channels $CH_O$ of the ultrasonic device 10, and a reception circuit for performing signal processing on a reception signal input from the reception channel $CH_I$.

The control circuit is formed of, for example, a microcomputer, and outputs an instruction signal of making the drive circuit perform transmission/reception processing of the ultrasonic wave. Further, the control circuit performs a variety of types of processing based on the reception signals input from the reception circuit of the drive circuit. For example, when using the ultrasonic apparatus 100 as the range sensor, the control circuit calculates the distance from the ultrasonic device 10 to the object based on the time from the transmission timing of the ultrasonic wave to the reception timing of the reception signal.

Wall Width and Wall Length of Wall 22 in Ultrasonic Device 10

Then, the wall width and the wall length of the wall 22 of the ultrasonic device 10 will be described based on FIG. 2.

It should be noted that in the following description, the wall 22 located between the opening parts 21 adjacent to each other in the transmission channel $CH_O$, namely the wall 22 located between the ultrasonic transmitters 11 adjacent to each other, is referred to as an inter-transmission wall $\mathbf{22}_O$. The wall 22 located between the opening parts 21 adjacent to each other in the reception channel $CH_I$, namely the wall 22 located between the ultrasonic receivers 12 adjacent to each other, is referred to as an inter-reception wall $\mathbf{22}_I$. The wall 22 disposed between the opening part 21 which is disposed in the transmission channel $CH_O$ adjacent to the reception channel $CH_I$, and is disposed closest to the reception channel $CH_I$, and the opening part 21 which is adjacent to that opening part 21, and is disposed in the reception channel $CH_I$, namely the wall 22 located between the ultrasonic transmitter 11 and the ultrasonic receiver 12 adjacent to each other, is referred to as a transmission-reception wall $\mathbf{22}_{IO}$. The ultrasonic transmitter 11 which is disposed in the transmission channel $CH_O$ adjacent to the reception channel $CH_I$, and is disposed closest to the reception channel $CH_I$ is referred to as an outermost ultrasonic transmitter 11A.

Further, the wall width of the wall 22 means the dimension of the wall 22 along the arrangement direction of the two opening parts 21 sandwiching the wall 22, namely the distance between the two opening parts 21 sandwiching the wall 22. Further, the wall length of the wall 22 means the length of the wall 22 from an end part on the vibrating plate 30 side to an end part at the opposite side to the vibrating plate 30, namely the dimension in the Z direction of the wall 22, and the thickness of the substrate 20.

Further, in the present embodiment, the width of a part of the protruding part 52 to be bonded to the vibrating plate 30 is smaller than the width of the wall 22. The width of the part of the protruding part 52 to be bonded to the vibrating plate 30 means the dimension of the protruding part 52 along the arrangement direction of the two vibrating sections 31 sandwiching the protruding part 52.

In the example shown in FIG. 2, the plurality of opening parts 21 lines along the Y direction, and in these opening parts 21, the opening part 21 which is located in the transmission channel $CH_O$, and is closest to the reception channel $CH_I$ corresponds to a first opening part 211 in the present disclosure, the opening part 21 which is located in the reception channel $CH_I$, and is adjacent to the first opening part in the X direction corresponds to a second opening part 212 in the present disclosure, and the transmission-reception wall $\mathbf{22}_{IO}$ located between the first opening part and the second opening part corresponds to a first wall in the present disclosure. Further, the opening part 21 which is located in the transmission channel $CH_O$, and is adjacent to the first opening part 211 corresponds to a third opening part 213 in the present disclosure, and the inter-transmission wall $\mathbf{22}_O$ located between the first opening part 211 and the third opening part 213 corresponds to a second wall in the present disclosure. Further, each of the vibrating sections 31 disposed at positions overlapping the first opening parts 211 in a plan view viewed from the Z direction corresponds to a first vibrating section 311 in the present disclosure, and the outermost ultrasonic transmitters 11A including these first vibrating sections 311 each correspond to a first ultrasonic transmitter 111 in the present disclosure. Each of the vibrating sections 31 disposed at positions overlapping the second opening parts 212 in the plan view viewed from the Z direction corresponds to a second vibrating section 312 in the present disclosure. Each of the vibrating sections 31 disposed at positions overlapping the third opening parts 213 in the plan view viewed from the Z direction corresponds to a third vibrating section 313 in the present disclosure, and the ultrasonic transmitters 11 including the third vibrating sections 313 each correspond to a second ultrasonic transmitter 112 in the present disclosure.

Further, in the present embodiment, the wall width $W_{IO}$ of the transmission-reception wall $\mathbf{22}_{IO}$ is made different in dimension from the wall width of the inter-transmission wall $\mathbf{22}_O$. As described above, when the wall width $W_O$ of the inter-transmission wall $22_O$ and the wall width $W_{IO}$ of the transmission-reception wall $22_{IO}$ are different from each other, when driving the ultrasonic transmitters 11 of the transmission channel $CH_O$, the crosstalk generated in that transmission channel $CH_O$ is reflected by the transmission-reception wall $22_{IO}$. Therefore, it is possible to suppress the influence of the crosstalk from the transmission channel $CH_O$ to the reception channel $CH_I$.

Further, the outermost ultrasonic transmitter 11A is the ultrasonic transmitter 11 the closest to the reception channel $CH_I$ of those in the transmission channel $CH_O$, and is the ultrasonic transmitter 11 which exerts the most significant influence of the crosstalk to the reception channel $CH_I$. The outermost ultrasonic transmitter 11A is formed by being surrounded by the transmission-reception wall $22_{IO}$ and the inter-transmission wall $22_O$. In this case, the crosstalk component from the outermost ultrasonic transmitter 11A to other ultrasonic transmitters 11 and the ultrasonic receivers 12 changes in accordance with the wall width $W_{IO}$ of the transmission-reception wall section $22_{IO}$ and the wall width $W_O$ of the inter-transmission wall $22_O$. In other words, when the crosstalk component from the outermost ultrasonic transmitter 11A to the ultrasonic transmitter 11 increases, the crosstalk component from the outermost ultrasonic transmitter 11A to the ultrasonic receiver 12 decreases accordingly.

Figure 4:
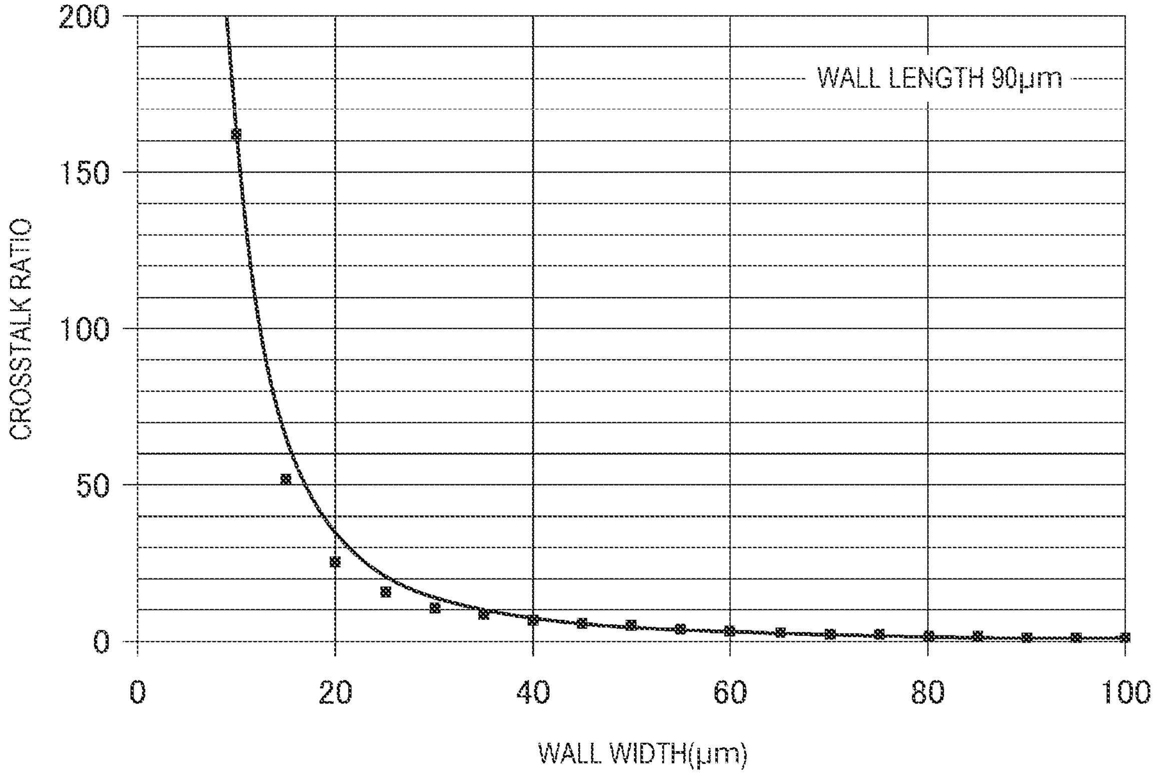
FIG. 4 is a diagram showing a relationship between the wall width of a wall and the crosstalk ratio in the present embodiment.
Figure 5:
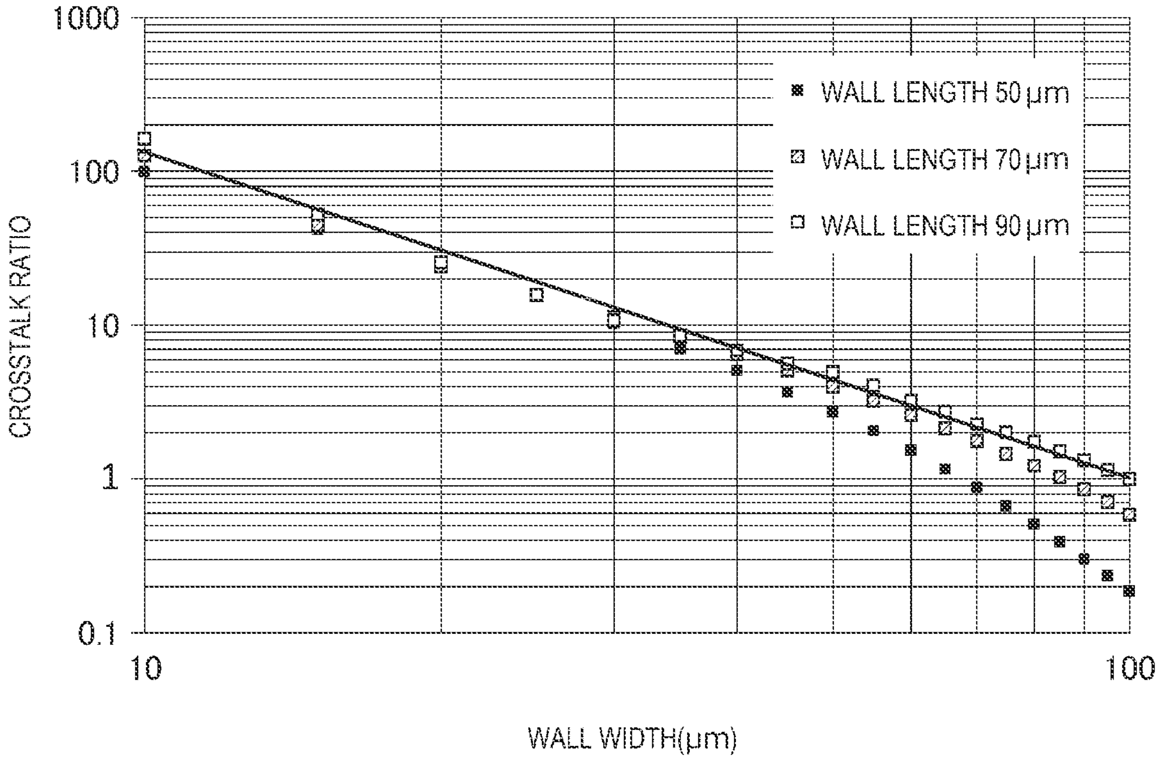
FIG. 5 is a diagram showing the relationship between the wall width of the wall and the crosstalk ratio in the present embodiment with respect to each of the cases of setting the wall length of the wall to 50 μm, 70 μm, and 90 μm, respectively.

FIG. 4 is a diagram showing a relationship between the wall width of the wall 22 surrounding the ultrasonic transmitter 11 and the crosstalk ratio. It should be noted that FIG. 4 shows the crosstalk ratio when fixing the wall length at 90 μm, and changing the wall width. Further, FIG. 5 is a diagram showing the relationship between the wall width of the wall 22 and the crosstalk ratio with respect to each of the cases of setting the wall length of the wall 22 surrounding the ultrasonic transmitter to 50 μm, 70 μm, and 90 μm, respectively. Further, the crosstalk ratio described here is a value representing the amplitude of the crosstalk when varying the wall width in a range from 10 μm to 100 μm assuming the amplitude of the crosstalk when setting the wall width to 100 μm, and the wall length to 90 μm as a reference value "1."

As shown in FIG. 4, the crosstalk ratio decreases as the wall width increases. In this case, taking the point at which the wall width is 40 μm as a changing point, when the wall width is smaller than 40 μm, the change in the crosstalk ratio is rapid. In contrast, when the wall width becomes longer than 40 μm, the crosstalk ratio decreases, but the change rate is low, and the change is gentle as shown in FIG. 4.

Further, FIG. 5 is a single logarithmic chart setting the axis representing the wall width of the wall 22 as a logarithmic axis, and when the wall length is 90 μm, the crosstalk ratio substantially linearly changes with respect to the change in the wall width. This shows the fact that the threshold value of the influence of the wall length on the crosstalk ratio is 90 μm. In other words, the crosstalk ratio when the wall length is no smaller than 90 μm becomes substantially the same as when the wall length is 90 μm. It should be noted that in FIG. 5, the crosstalk ratio with respect to the wall width when the wall length is no smaller than 90 μm is omitted from the illustration taking the eye-friendliness into consideration.

As shown in FIG. 5, by setting the wall length no larger than 90 μm, it is possible to reduce the crosstalk ratio. Incidentally, the crosstalk ratio is reduced only when the wall width is no smaller than 40 μm, and when the wall width is smaller than 40 μm, the difference in crosstalk ratio is extremely small even when setting the wall length no larger than 90 μm.

As is understood from FIG. 4, when making the wall width $W_{IO}$ of the transmission-reception wall $22_{IO}$ larger than the wall width $W_O$ of the inter-transmission wall $22_O$, the crosstalk ratio from the outermost ultrasonic transmitter 11A to the ultrasonic receiver 12 of the reception channel $CH_I$ becomes lower than the crosstalk ratio from the outermost ultrasonic transmitter 11A to the ultrasonic transmitter 11 adjacent to the outermost ultrasonic transmitter 11A in the transmission channel $CH_O$. In other words, the crosstalk from the outermost ultrasonic transmitter 11A to the ultrasonic receiver 12 of the reception channel $CH_I$ is reduced.

Further, the wall width $W_{IO}$ of the transmission-reception wall $22_{IO}$ is preferably no smaller than 40 μm. Thus, the crosstalk from the outermost ultrasonic transmitter 11A to the ultrasonic receiver 12 of the reception channel $CH_I$ can more effectively be reduced. In contrast, when the wall width $W_{IO}$ of the transmission-reception wall $22_{IO}$ exceeds 90 μm, there is a possibility that the growth in planar size of the ultrasonic device 10 is incurred, and depending on the transmission angle of the ultrasonic wave transmitted from the transmission channel $CH_O$, the reception sensitivity when receiving the ultrasonic wave reflected by the object with the reception channel $CH_I$ reduces. Therefore, it is more preferable to make the wall width $W_{IO}$ of the transmission-reception wall $22_{IO}$ no smaller than 40 μm and no larger than 90 μm.

Moreover, as shown in FIG. 5, it is preferable to make the wall length of the transmission-reception wall $22_{IO}$ no larger than 90 μm. On the other hand, when making the wall length smaller than 30 μm, the mechanical strength of the inter-transmission wall $22_O$ reduces. Therefore, it is more preferable to make the wall length of the inter-transmission wall $22_O$ no smaller than 30 μm and no larger than 90 μm.

In contrast, it is preferable to make the wall width $W_O$ of the inter-transmission wall $22_O$ smaller than 40 μm. Thus, it is possible to increase the crosstalk component from the outermost ultrasonic transmitter 11A to the ultrasonic transmitter 11 adjacent to the outermost ultrasonic transmitter 11A in the transmission channel $CH_O$. Therefore, the crosstalk from the outermost ultrasonic transmitter 11A to the ultrasonic receiver 12 of the reception channel $CH_I$ can more effectively be reduced. On the other hand, when making the wall width $W_O$ of the inter-transmission wall $22_O$ smaller than 30 μm, the mechanical strength of the inter-transmission wall $22_O$ reduces. Therefore, it is more preferable to make the wall width $W_O$ of the inter-transmission wall $22_O$ no smaller than 30 μm and smaller than 40 μm.

Further, it is preferable to form the inter-transmission walls $22_O$ and the transmission-reception walls $22_{IO}$ by providing the opening parts 21 to the substrate 20 as a parallel plate with etching or the like taking the manufacturing process into consideration. Therefore, the wall length of the inter-transmission wall $22_O$ becomes the same in dimension as the wall length of the transmission-reception wall $22_{IO}$. Here, when making the wall width $W_O$ of the inter-transmission wall $22_O$ smaller than 40 μm, the influence of the crosstalk ratio by the wall length is extremely small as shown in FIG. 5. Therefore, even when the wall length of the inter-transmission wall $22_O$ is small, there is no chance for the crosstalk component from the outermost ultrasonic transmitter 11A toward the reception channel $CH_I$ to increase.

It should be noted that it is preferable to make the wall width $W_I$ of the inter-reception wall $22_1$ the same in dimension as the wall width $W_O$ of the inter-transmission wall $22_O$. Further, it is preferable to make the wall 22 between the transmission channels $CH_O$ adjacent to each other the same in dimension as the wall width $W_{IO}$. In this case, it is possible to commonalize the opening parts 21 between the three channels lining in the X direction.

Protruding Part Wall Width and Protruding Part Wall Length of Protruding Part 52 in Ultrasonic Device 10

As described above, in the present embodiment, the edges on the ±Y sides of the vibrating section 31 are defined by edges of the walls 22 constituting the opening part 21. On the other hand, the edges on the ±X sides of the vibrating section 31 are defined by edges of the protruding parts 52 of the protective member 50.

In the following description, the protruding part 52 disposed between the ultrasonic transmitters 11 is referred to as an inter-transmission protruding part $52_O$, the protruding part 52 disposed between the ultrasonic receivers 12 is referred to as an inter-reception protruding part $52_I$, and the protruding part 52 disposed between the outermost ultrasonic transmitter 11A and the ultrasonic receiver 12 is referred to as a transmission-reception protruding part $52_{IO}$.

Further, the protruding part wall width means the dimension of the protruding part 52 along the arrangement direction of the vibrating sections 31 disposed so as to sandwich the protruding part 52, namely the distance between the two vibrating sections 31 sandwiching the protruding part 52. Further, the protruding dimension of the protruding part 52 from the base part 51 to the vibrating plate 30, namely the groove depth of the recessed part 53, is referred to as the protruding part wall length.

In the example shown in FIG. 3, the plurality of vibrating sections 31 lines in the X direction across the protruding part 52, and in these vibrating sections 31, the vibrating section 31 which is located in the transmission channel $CH_O$, and is closest to the reception channel $CH_I$ corresponds to a fourth vibrating section 314 in the present disclosure, the vibrating section 31 which is located in the reception channel $CH_I$, and is adjacent to the fourth vibrating section 314 in the X direction corresponds to a fifth vibrating section 315 in the present disclosure, and the transmission-reception protruding part $52_{IO}$ located between the fourth vibrating section 314 and the fifth vibrating section 315 corresponds to a first protruding part in the present disclosure. Further, another vibrating section 31 which is located in the transmission channel $CH_O$, and is adjacent to the fourth vibrating section 314 corresponds to a sixth vibrating section 316 in the present disclosure, and the inter-transmission protruding part $52_O$ located between the fourth vibrating section 314 and the sixth vibrating section 316 corresponds to a second protruding part in the present disclosure. Further, the outermost ultrasonic transmitter 11A including the fourth vibrating section 314 corresponds to a third ultrasonic transmitter 113 in the present disclosure. The fifth vibrating section 315 and the piezoelectric element 40 disposed in the fifth vibrating section 315 constitute one ultrasonic receiver 12. The ultrasonic transmitter 11 including the sixth vibrating section 316 corresponds to a fourth ultrasonic transmitter 114 in the present disclosure.

Further, in the present embodiment, the protruding part wall width $U_{IO}$ of the transmission-reception protruding part $52_{IO}$ is made different in dimension from the protruding part wall width $U_O$ of the inter-transmission protruding part $52_O$. As described above, when the protruding part wall width $U_O$ of the inter-transmission protruding part $52_O$ and the protruding part wall width $U_{IO}$ of the transmission-reception protruding part $52_{IO}$ are different from each other, when driving the ultrasonic transmitters 11 of the transmission channel $CH_O$, the crosstalk generated in that transmission channel $CH_O$ is reflected by the transmission-reception protruding part $52_{IO}$. Therefore, it is possible to suppress the influence of the crosstalk from the transmission channel $CH_O$ to the reception channel $CH_I$.

Figure 6:
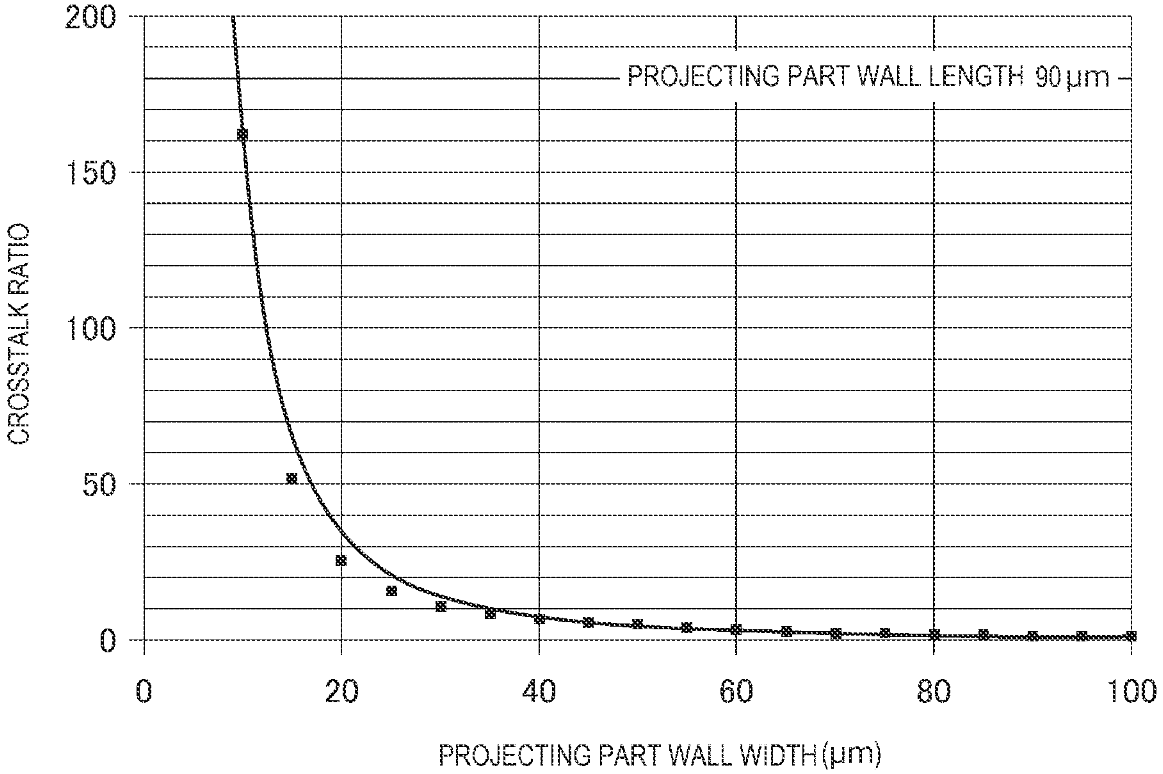
FIG. 6 is a diagram showing a relationship between the wall width of a protruding part and the crosstalk ratio in the present embodiment.
Figure 7:
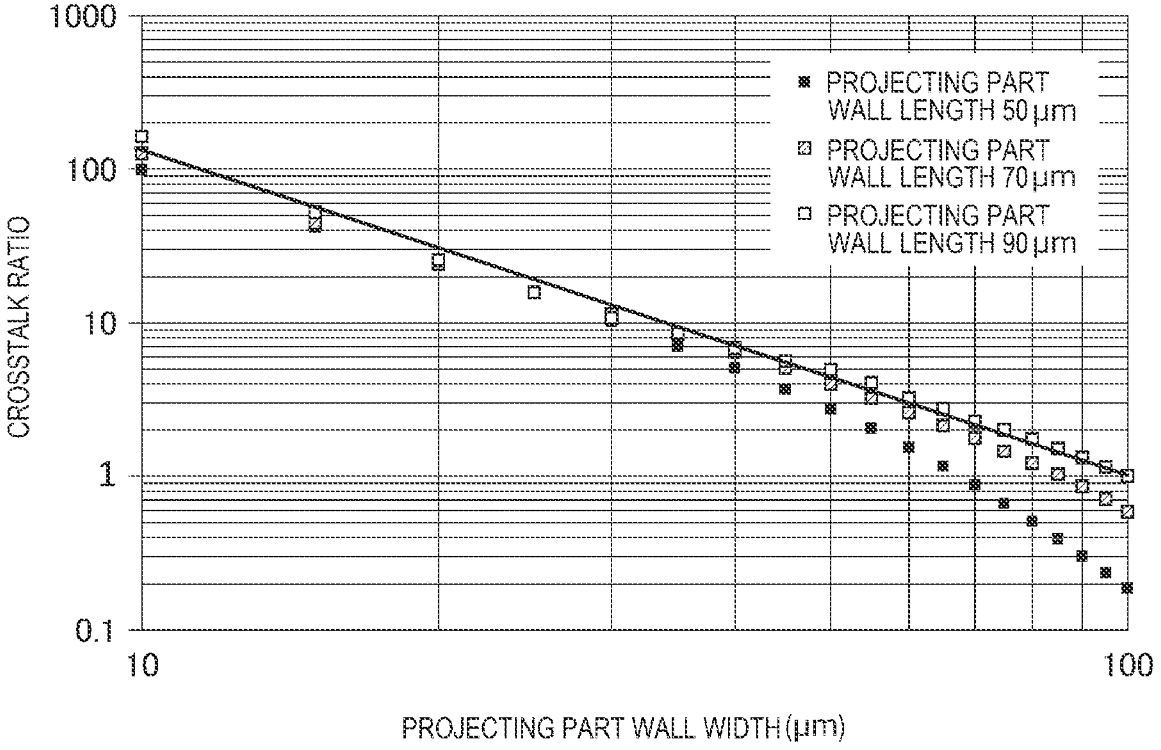
FIG. 7 is a diagram showing the relationship between the protruding part wall width and the crosstalk ratio in the present embodiment with respect to each of the cases of setting the protruding part wall length to 50 μm, 70 μm, and 90 μm, respectively.

FIG. 6 is a diagram showing a relationship between the protruding part wall width and the crosstalk ratio. It should be noted that in FIG. 6, the protruding part wall length is fixed at 90 μm. Further, FIG. 7 is a diagram showing the relationship between the protruding part wall width and the crosstalk ratio with respect to each of the cases of setting the protruding part wall length of the protruding part 52 to 50 μm, 70 μm, and 90 μm, respectively. Further, the crosstalk ratio described in the present embodiment is a value representing the amplitude of the crosstalk when varying the protruding part wall width in a range from 10 μm to 100 μm assuming the amplitude of the crosstalk when setting the protruding part wall width to 100 μm, and the protruding part wall length to 90 μm as a reference value "1."

As shown in FIG. 6, the relationship between the protruding part wall width and the crosstalk ratio is substantially the same as the relationship between the wall width and the crosstalk ratio, and the crosstalk ratio decreases as the protruding part wall width increases. More specifically, taking the point at which the wall width is 40 μm as a changing point, when the protruding part wall width is smaller than 40 μm, the change in the crosstalk ratio is rapid. In contrast, when the protruding part wall width is no smaller than 40 μm, the change in the crosstalk ratio is gentle with respect to the change in the protruding part wall width.

Further, as shown in FIG. 7, in the single logarithmic chart setting the axis representing the protruding part wall width of the protruding part 52 as a logarithmic axis, the crosstalk ratio changes substantially linearly with respect to the change in wall width when the protruding part wall length is 90 μm similarly to the relationship between the wall width and the crosstalk ratio shown in FIG. 5. This shows the fact that the threshold value of the influence of the protruding part wall length on the crosstalk ratio is 90 μm. In other words, the crosstalk ratio when the protruding part wall length is no smaller than 90 μm becomes substantially the same as when the protruding part wall length is 90 μm.

As shown in FIG. 7, by setting the wall length no larger than 90 μm, it is possible to further reduce the crosstalk ratio. Incidentally, the crosstalk ratio is reduced only when the protruding part wall width is no smaller than 40 μm, and when the protruding part wall width is smaller than 40 μm, the difference in crosstalk ratio is extremely small even when setting the protruding part wall length no larger than 90 μm.

As is understood from FIG. 6, when making the protruding part wall width $U_{IO}$ of the transmission-reception protruding part $52_{IO}$ larger than the protruding part wall width $U_O$ of the inter-transmission protruding part $52_O$, the crosstalk ratio from the outermost ultrasonic transmitter 11A to the ultrasonic receiver 12 of the reception channel $CH_I$ becomes lower than the crosstalk ratio from the outermost ultrasonic transmitter 11A to the ultrasonic transmitter 11 adjacent to the outermost ultrasonic transmitter 11A in the transmission channel $CH_O$. In other words, the crosstalk from the outermost ultrasonic transmitter 11A to the ultrasonic receiver 12 of the reception channel $CH_I$ is reduced.

Further, the protruding part wall width $U_{IO}$ of the transmission-reception protruding part $52_{IO}$ is preferably no smaller than 40 μm. Thus, the crosstalk from the outermost ultrasonic transmitter 11A to the ultrasonic receiver 12 of the reception channel $CH_I$ can more effectively be reduced. In contrast, when the protruding part wall width $U_{IO}$ of the transmission-reception protruding part $52_{IO}$ exceeds 90 μm, there is a possibility that the growth in planar size of the ultrasonic device 10 is incurred, and depending on the transmission angle of the ultrasonic wave transmitted from the transmission channel $CH_O$, the reception sensitivity when receiving the ultrasonic wave reflected by the object with the reception channel $CH_I$ reduces. Therefore, it is more preferable to make the protruding part wall width $U_{IO}$ of the transmission-reception protruding part $52_{IO}$ no smaller than 40 μm and no larger than 90 μm.

Moreover, as shown in FIG. 7, it is preferable to make the protruding part wall length of the transmission-reception protruding part $52_{IO}$ no larger than 90 μm. Incidentally, when making the protruding part wall length smaller than 20 μm, there is a possibility that the protective member 50 makes contact with the piezoelectric element 40 vibrating together with the vibrating section 31. Therefore, it is more preferable to make the protruding part wall length of the inter-transmission protruding part $52_O$ no smaller than 20 μm and no larger than 90 μm.

In contrast, it is preferable to make the protruding part wall width $U_O$ of the inter-transmission protruding part $52_O$ smaller than 40 μm. Thus, it is possible to increase the crosstalk component from the outermost ultrasonic transmitter 11A to the ultrasonic transmitter 11 adjacent to the outermost ultrasonic transmitter 11A in the transmission channel $CH_O$. Therefore, the crosstalk from the outermost ultrasonic transmitter 11A to the ultrasonic receiver 12 of the reception channel $CH_I$ can more effectively be reduced. Incidentally, when making the protruding part wall width $U_O$ of the inter-transmission protruding part $52_O$ smaller than 30 μm, the mechanical strength of the inter-transmission protruding part $52_O$ reduces, and at the same time, the bonding strength between the vibrating plate 30 and the protruding part 52 also reduces. Therefore, it is more preferable to make the protruding part wall width $U_O$ of the inter-transmission protruding part $52_O$ no smaller than 30 μm and smaller than 40 μm.

Further, in the protective member 50, it is preferable to provide the recessed parts 53 to a parallel plate, or to bond the protruding parts 52 to the base part 51 as the parallel plate taking the manufacturing process into consideration. In this case, the inter-transmission protruding part $52_O$ and the transmission-reception protruding part $52_{IO}$ become the same in dimension as each other. When making the protruding part wall width $U_O$ of the inter-transmission protruding part $52_O$ smaller than 40 μm, the influence of the crosstalk ratio by the protruding part wall length is extremely small as shown in FIG. 7. Therefore, even when the protruding part wall length of the inter-transmission protruding part $52_O$ is small, there is no chance for the crosstalk component from the outermost ultrasonic transmitter 11A toward the reception channel $CH_I$ to increase.

It should be noted that it is also possible to make the protruding part wall width $U_I$ of the inter-reception protruding part $52_I$ smaller than the protruding part wall width $U_{IO}$ and the protruding part wall width $U_O$. As shown in FIG. 1, when disposing the eight transmission channels $CH_O$ so as to surround the ±X sides and the ±Y sides of the reception channel $CH_I$, the distance between the transmission channels $CH_O$ becomes the protruding part wall width $U_O$. In this case, since the protruding part wall width $U_{IO}$ of the transmission-reception protruding part $52_{IO}$ becomes larger than the protruding part wall width $U_O$, the protruding part wall width $U_I$ of the inter-reception protruding part $52_I$ is made smaller than the protruding part wall width $U_O$, accordingly. Thus, it is possible to optimize the arrangement of the ultrasonic transmitters 11 and the ultrasonic receiver 12 in the ultrasonic device 10.

Functions and Advantages of Present Embodiment

The ultrasonic device 10 of the ultrasonic apparatus 100 according to the present embodiment is provided with the substrate 20 provided with the plurality of opening parts 21 and the walls 22 each disposed between the opening parts 21 adjacent to each other, the vibrating plate 30 closing the opening parts 21, and the piezoelectric elements 40 (the vibrators) disposed on the vibrating plate 30 at the positions overlapping the opening parts 21 in the plan view viewed from the Z direction. The plurality of opening parts 21 includes the first opening part 211, the second opening part 212 adjacent to the first opening part 211 via the transmission-reception wall $22_{IO}$ (the first wall), and the third opening part 213 adjacent to the first opening part 211 via the inter-transmission wall $22_O$ (the second wall). The first vibrating section 311 closing the first opening part 211 of the vibrating plate 30 and the piezoelectric element 40 disposed in the first vibrating section 311 constitute the first ultrasonic transmitter 111 (the outermost ultrasonic transmitter 11A) for transmitting the ultrasonic wave. The second vibrating section 312 closing the second opening part 212 of the vibrating plate 30 and the piezoelectric element 40 disposed in the second vibrating section 312 constitute the ultrasonic receiver 12 for receiving the ultrasonic wave. The third vibrating section 313 closing the third opening part 213 of the vibrating plate 30 and the piezoelectric element 40 disposed in the third vibrating section 313 constitute the second ultrasonic transmitter 112 for transmitting the ultrasonic wave. Further, in the present embodiment, the wall width $W_{IO}$ of the transmission-reception wall $22_{IO}$ is larger than the wall width $W_O$ of the inter-transmission wall $22_O$.

In such a present embodiment, since the wall width $W_O$ of the inter-transmission wall $22_O$ and the wall width $W_{IO}$ of the transmission-reception wall $22_{IO}$ are different from each other, due to the principle of antiresonance, the crosstalk from the transmission channel $CH_O$ toward the reception channel $CH_I$ is reflected by the transmission-reception wall $22_{IO}$. Further, since the wall width $W_{IO}$ is larger than the wall width $W_O$, the crosstalk component from the outermost ultrasonic transmitter 11A to the reception channel $CH_I$ becomes smaller than the crosstalk component from the outermost ultrasonic transmitter 11A to the transmission channel $CH_O$. Thus, it is possible to suppress the crosstalk from the transmission channel $CH_O$ to the reception channel $CH_I$. Further, in the present embodiment, since there is no need to provide a concave groove or the like to the substrate 20, strength reduction of the substrate 20 does not occur, and the configuration of the ultrasonic device 10 is not complicated as well. In other words, in the present embodiment, it is possible to suppress the crosstalk while preventing the strength reduction of the substrate 20 with the simple configuration.

In the ultrasonic device 10 according to the present embodiment, the wall width $W_{IO}$ of the transmission-reception wall $22_{IO}$ is no smaller than 40 μm, and the wall width $W_O$ of the inter-transmission wall $22_O$ is smaller than 40 μm.

As shown in FIG. 3, taking the point at which the wall width is 40 μm as a change point, when the wall width is no smaller than 40 μm, the crosstalk ratio is stably maintained to a low value no higher than 10. In contrast, when the wall width is lower than 40 μm, the smaller the wall width becomes, the higher the crosstalk ratio becomes, and at the same time, the change in crosstalk becomes rapid. Therefore, by making the wall width $W_{IO}$ no smaller than 40 μm, the crosstalk component from the outermost ultrasonic transmitter 11A toward the reception channel $CH_I$ decreases, and by making the wall width $W_O$ smaller than 40 μm, the crosstalk component from the outermost ultrasonic transmitter 11A toward another ultrasonic transmitter 11 in the transmission channel $CH_O$ increases. Thus, it is possible to further reduce the crosstalk from the transmission channel $CH_O$ to the reception channel $CH_I$.

In the ultrasonic device 10 according to the present embodiment, the wall length of the walls 22 including the inter-transmission wall $\mathbf{22}_O$, the transmission-reception wall $\mathbf{22}_{IO}$, and the inter-reception wall $\mathbf{22}_I$ is no larger than 90 μm.

By making the wall length of the transmission-reception wall $\mathbf{22}_{IO}$ no larger than 90 μm, it is possible to reduce the crosstalk ratio, and it is possible to further suppress the crosstalk from the ultrasonic transmitter 11 in the transmission channel $CH_O$ to the reception channel $CH_I$. Further, when the wall width of the wall 22 is smaller than 40 μm, the change in the crosstalk ratio due to the difference in wall length is extremely small. Therefore, there is no chance that the crosstalk component between the ultrasonic transmitters 11 decreases by making the wall width $W_O$ of the inter-transmission wall $\mathbf{22}_O$ smaller than 40 μm. In other words, the crosstalk component from the outermost ultrasonic transmitter 11A toward the reception channel $CH_I$ is reduced, and the crosstalk component toward another ultrasonic transmitter 11 in the transmission channel $CH_O$ is increased, and thus, it is possible to further reduce the crosstalk from the transmission channel $CH_O$ to the reception channel $CH_I$.

The ultrasonic device 10 according to the present embodiment is provided with the vibrating plate 30, the protective member 50 provided with the protruding parts 52 which is bonded to the vibrating plate 30 to divide the vibrating plate 30 into the plurality of vibrating sections 31, and the piezoelectric elements 40 (the vibrators) disposed in the respective vibrating sections 31. The plurality of vibrating sections 31 includes the fourth vibrating section 314, the fifth vibrating section 315 adjacent to the fourth vibrating section 314 via the transmission-reception protruding part $\mathbf{52}_{IO}$ (the first projecting part), and the sixth vibrating section 316 adjacent to the fourth vibrating section 314 via the inter-transmission protruding part $\mathbf{52}_O$ (the second protruding part). The fourth vibrating section 314 and the piezoelectric element 40 disposed in the fourth vibrating section 314 constitute the third ultrasonic transmitter 113 as the outermost ultrasonic transmitter 11A. The fifth vibrating section 315 and the piezoelectric element 40 disposed in the fifth vibrating section 315 constitute the ultrasonic receiver 12. The sixth vibrating section 316 and the piezoelectric element 40 disposed in the sixth vibrating section 316 constitute the fourth ultrasonic transmitter 114. Further, the protruding part wall width $U_{IO}$ of the transmission-reception protruding part $\mathbf{52}_{IO}$ is larger than the protruding part wall width $U_O$ of the inter-transmission protruding part $\mathbf{52}_O$.

In such a present embodiment, since the protruding part wall width $U_O$ of the inter-transmission protruding part $\mathbf{52}_O$ and the protruding part wall width $U_{IO}$ of the transmission-reception protruding part $\mathbf{52}_{IO}$ are different from each other, due to the principle of antiresonance, the crosstalk from the transmission channel $CH_O$ to the reception channel $CH_I$ is reflected by the transmission-reception protruding part $\mathbf{52}_{IO}$. Further, since the protruding part wall width $U_{IO}$ is larger than the protruding part wall width $U_O$, the crosstalk component from the outermost ultrasonic transmitter 11A to the reception channel $CH_I$ becomes smaller than the crosstalk component from the outermost ultrasonic transmitter 11A to the transmission channel $CH_O$. Thus, it is possible to suppress the crosstalk from the transmission channel $CH_O$ to the reception channel $CH_I$. Further, in the present embodiment, since there is no need to provide a concave groove or the like to the substrate 20, strength reduction of the substrate 20 does not occur, and the configuration of the ultrasonic device is not complicated as well. Therefore, it is possible to suppress the crosstalk while preventing the strength reduction of the substrate 20 with the simple configuration.

In the ultrasonic device 10 according to the present embodiment, the protruding part wall width $U_{IO}$ of the transmission-reception protruding part $\mathbf{52}_{IO}$ is no smaller than 40 μm, and the protruding part wall width $U_O$ of the inter-transmission protruding part $\mathbf{52}_O$ is smaller than 40 μm.

As shown in FIG. 6, taking the point at which the wall width is 40 μm as a change point, when the protruding part wall width is no smaller than 40 μm, the crosstalk ratio is stably maintained to a low value no higher than 10. In contrast, when the protruding part wall width is lower than 40 μm, the smaller the wall width becomes, the more rapidly the crosstalk ratio increases. Therefore, by making the protruding part wall width $U_{IO}$ no smaller than 40 μm, it is possible to reduce the crosstalk component from the outermost ultrasonic transmitter 11A toward the reception channel $CH_I$, and by making the protruding part wall width $U_O$ smaller than 40 μm, it is possible to increase the crosstalk component from the outermost ultrasonic transmitter 11A toward another ultrasonic transmitter 11 in the transmission channel $CH_O$. Thus, it is possible to further reduce the crosstalk from the transmission channel $CH_O$ to the reception channel $CH_I$.

In the ultrasonic device 10 according to the present embodiment, the wall length of the protruding parts 52 including the inter-transmission protruding part $\mathbf{52}_O$, the transmission-reception protruding part $\mathbf{52}_{IO}$, and the inter-reception protruding part $\mathbf{52}_I$ is no larger than 90 μm.

By making the protruding part wall length of the transmission-reception protruding part $\mathbf{52}_{IO}$ no larger than 90 μm, it is possible to reduce the crosstalk ratio, and it is possible to further suppress the crosstalk from the ultrasonic transmitter 11 in the transmission channel $CH_O$ to the reception channel $CH_I$. Further, when the protruding part wall width of the protruding part 52 is smaller than 40 μm, the change in the crosstalk ratio due to the difference in the projection part wall length is extremely small. Therefore, there is no chance that the crosstalk component between the ultrasonic transmitters 11 decreases by making the projecting part wall width $U_O$ of the inter-transmission protruding part $\mathbf{52}_O$ smaller than 40 μm. In other words, the crosstalk component from the outermost ultrasonic transmitter 11A to the reception channel $CH_I$ is reduced, and the crosstalk component to another ultrasonic transmitter 11 in the transmission channel $CH_O$ is increased, and thus, it is possible to further reduce the crosstalk from the transmission channel $CH_O$ to the reception channel $CH_I$.

MODIFIED EXAMPLES

It should be noted that the present disclosure is not limited to each of the embodiments described above, but includes modifications and improvements within a range where the advantages of the present disclosure can be achieved, and configurations, which can be obtained by, for example, arbitrarily combining the embodiments.

Modified Example 1

For example, in the embodiment described above, it is assumed that the vibrating section 31 is the area surrounded by the edges of the opening parts 21 elongated in the X direction, and the edges of the protruding parts 52 elongated in the Y direction out of the vibrating plate 30. In contrast, it is possible to adopt a configuration in which the substrate is provided with a plurality of opening parts corresponding respectively to the vibrating sections 31, and a configuration in which the opening parts are arranged in the X direction and the Y direction to form a two-dimensional array structure. In this case, the outer shape of the vibrating section 31 is defined by only the edges (the edges of the wall) of the opening part.

When adopting such a configuration, it is sufficient to form each of the opening parts so that the wall width $W_{IO}$ of the transmission-reception wall $\mathbf{22}_{IO}$ becomes larger than the wall width $W_O$ of the inter-transmission wall $\mathbf{22}_O$ not only in the Y direction but also in the X direction. In this case, it is not required to provide the protective member 50 with the protruding parts 52.

Further, it is also possible to adopt a configuration in which the protective member 50 is provided with a plurality of recessed parts opposed to the respective vibrating sections 31, and a configuration in which the outer shape of each of the vibrating sections 31 is defined by only the edges of the recessed part. In this case, there is adopted a configuration in which the recessed parts are arranged in the X direction and the Y direction to form a two-dimensional array structure.

When adopting such a configuration, it is sufficient to form each of the recessed parts so that the protruding part wall width $U_{IO}$ of the transmission-reception projecting part $\mathbf{52}_{IO}$ becomes larger than the protruding part wall width $U_O$ of the inter-transmission protruding part $\mathbf{52}_O$ not only in the X direction but also in the Y direction. In this case, it is not required to provide the substrate 20.

Further, it is also possible to adopt a configuration in which the substrate is provided with a plurality of opening parts corresponding respectively to the vibrating sections 31, and at the same time, the protective member is provided with a plurality of recessed parts corresponding respectively to the vibrating sections 31. In this case, it is also possible to make the protruding part wall width of the protruding part 52 the same in dimension as the wall width of the wall 22.

Specifically, there is adopted a configuration in which the wall width $W_{IO}$ of the transmission-reception wall $\mathbf{22}_{IO}$ and the protruding part wall width $U_{IO}$ of the transmission-reception protruding part $\mathbf{52}_{IO}$ are made the same in dimension as each other, the wall width $W_O$ of the inter-transmission wall $\mathbf{22}_O$ and the protruding part wall width $U_O$ of the inter-transmission protruding part $\mathbf{52}_O$ are made the same in dimension as each other, and the wall width $W_{IO}$ and the protruding part wall width $U_{IO}$ become larger than the wall width $W_O$ and the protruding part wall width $U_O$. In this case, it is preferable to make the wall length of the wall 22 and the protruding part wall length of the protruding part 52 also the same in dimension as each other.

Modified Example 2

Although in the embodiment described above, there is described the example in which the wall length of the wall 22 is made no larger than 90 μm, and the protruding part wall length of the protruding part 52 is made no larger than 90 μm, this example is not a limitation.

For example, the wall length of the wall 22 can be made larger than 90 μm, and the protruding part wall length of the protruding part 52 can be made larger than 90 μm.

In this case, even when the value of the wall length of the wall 22 or the protruding part wall length of the protruding part 52 varies in some degree due to a manufacturing error of the ultrasonic device 10, the crosstalk ratio does not vary. Therefore, it is possible to provide the ultrasonic device 10 in which there is no chance for the influence of the crosstalk from the transmission channel $CH_O$ to the reception channel $CH_I$ to vary due to the manufacturing error, which adopts the robust design, and which has the stable transmission/reception performance.

Further, it is also possible to make the wall length and the protruding part wall length different in accordance with the positions of the wall 22 and the protruding part 52.

For example, it is possible for the transmission-reception wall $\mathbf{22}_{IO}$ to be smaller in wall length compared to the inter-transmission wall $\mathbf{22}_O$. Similarly, it is possible for the transmission-reception protruding part $\mathbf{52}_{IO}$ to be smaller in protruding part wall length compared to the inter-transmission protruding part $\mathbf{52}_O$.

Modified Example 3

In the embodiment described above, there is described the example in which the wall width $W_{IO}$ of the transmission-reception wall $\mathbf{22}_{IO}$ is made no smaller than 40 μm and no larger than 90 μm, and the wall width $W_O$ of the inter-transmission wall $\mathbf{22}_O$ is made no smaller than 30 μm and smaller than 40 μm. Further, there is described the example in which the protruding part wall width $U_{IO}$ of the transmission-reception protruding part $\mathbf{52}_{IO}$ is made no smaller than 40 μm and no larger than 90 μm, and the protruding part wall width $U_O$ of the inter-transmission protruding part $\mathbf{52}_O$ is made no smaller than 30 μm and smaller than 40 μm. In contrast, the wall width $W_{IO}$, the wall width $W_O$, the protruding part wall width $U_{IO}$, and the protruding part wall width $U_O$ are not limited to the above.

For example, it is also possible for the wall width $W_{IO}$ to be smaller than 40 μm as long as the wall width $W_{IO}$ of the transmission-reception wall $\mathbf{22}_{IO}$ is larger than the wall width $W_O$ of the inter-transmission wall $\mathbf{22}_O$. Further, it is also possible for the wall width $W_O$ to be no smaller than 40 μm as long as the wall width $W_{IO}$ of the transmission-reception wall $\mathbf{22}_{IO}$ is larger than the wall width $W_O$ of the inter-transmission wall $\mathbf{22}_O$. It should be noted that as shown in FIG. 4, when the wall width is no smaller than 40 μm, the crosstalk ratio with respect to the wall width becomes low in change rate. Therefore, when making the wall width $W_O$ and the wall width $W_{IO}$ no smaller than 40 μm, it is preferable to, for example, decrease the wall length to thereby reduce the crosstalk component to the reception channel $CH_I$.

Further, for example, when adopting a configuration capable of controlling the transmission direction of the ultrasonic wave transmitted form the transmission channel $CH_O$, and so on, it is possible for the wall width $W_{IO}$ to be no smaller than 90 μm. Further, when the strength of the inter-transmission wall $\mathbf{22}_O$ is sufficiently high due to the modification of the material of the substrate 20 or the like, it is possible to make the wall width $W_O$ smaller than 30 μm.

It should be noted that the same applies to the protruding part wall width $U_{IO}$ of the protruding part 52 and the protruding part wall width $U_O$.

Modified Example 4

In the embodiment described above, the piezoelectric element 40 is illustrated as the vibrator, but this is not a limitation.

For example, as the vibrator, it is possible to adopt a configuration of provided with a first electrode provided to the vibrating section, and a second electrode fixed to the first electrode via a gap. In this case, by applying a periodic drive voltage between the first electrode and the second electrode, an electrostatic attractive force acting between the first electrode and the second electrode varies periodically to vibrate the vibrating section, and thus, it is possible to transmit the ultrasonic wave in accordance with the vibration of the vibrating section from the transmission channel. Further, since the vibrating section vibrates when the ultrasonic wave is received by the reception channel, by detecting a variation in capacitance between the first electrode and the second electrode, it is possible to detect the reception of the ultrasonic wave.

CONCLUSION OF PRESENT DISCLOSURE

An ultrasonic device according to a first aspect of the present disclosure includes a substrate having a plurality of opening parts, and a wall disposed between the opening parts adjacent to each other, a vibrating plate configured to close the opening parts, and vibrators provided to the vibrating plate at positions overlapping the opening parts when viewed from a stacking direction of the substrate and the vibrating plate, wherein the plurality of opening parts includes a first opening part, a second opening part adjacent to the first opening part via a first wall, and a third opening part adjacent to the first opening part via a second wall, a first vibrating section configured to close the first opening part in the vibrating plate and the vibrator disposed in the first vibrating section constitute a first ultrasonic transmitter configured to transmit an ultrasonic wave, a second vibrating section configured to close the second opening part in the vibrating plate and the vibrator disposed in the second vibrating section constitute an ultrasonic receiver configured to receive an ultrasonic wave, a third vibrating section configured to close the third opening part in the vibrating plate and the vibrator disposed in the third vibrating section constitute a second ultrasonic transmitter configured to transmit an ultrasonic wave, and a width of the first wall from the first opening part to the second opening part is larger than a width of the second wall from the first opening part to the third opening part.

In the present aspect, since the wall width of the first wall and the wall width of the second wall are different from each other, due to the principle of antiresonance, the crosstalk component from the first ultrasonic transmitter toward the ultrasonic receiver is reflected by the first wall. Further, since the wall width of the first wall is larger than the wall width of the second wall, the crosstalk component from the first ultrasonic transmitter to the ultrasonic receiver becomes smaller than the crosstalk component from the first ultrasonic transmitter to the second ultrasonic transmitter. Thus, it is possible to suppress the crosstalk from the first ultrasonic transmitter to the ultrasonic receiver. Further, in the present aspect, since there is no need to provide a concave groove or the like to the substrate, the strength reduction of the substrate does not occur, and the configuration of the ultrasonic device is not complicated as well. In other words, in the present aspect, it is possible to suppress the crosstalk while preventing the strength reduction of the substrate with the simple configuration.

In the ultrasonic device according to the first aspect, the width of the first wall from the first opening part to the second opening part may be no smaller than 40 μm, and the width of the second wall from the first opening part to the third opening part may be smaller than 40 μm.

When transmitting the ultrasonic wave from the ultrasonic transmitter, in the relationship between the wall width of the wall surrounding the ultrasonic transmitter and the crosstalk from the ultrasonic transmitter to another ultrasonic transmitter or the ultrasonic receiver, the amplitude of the crosstalk decreases as the wall width increases. On this occasion, taking the point at which the wall width of the wall is 40 μm as a change point, when the wall width is no smaller than 40 μm, the amplitude of the crosstalk decreases as the wall width increases, but the reduction amount is small. In contrast, when the wall width is lower than 40 μm, the smaller the wall width becomes, the higher the amplitude of the crosstalk becomes, and at the same time, the change in the amplitude becomes rapid. Therefore, by making the wall width of the first wall no smaller than 40 μm, it is possible to reduce the crosstalk component from the first ultrasonic transmitter toward the ultrasonic receiver, and by making the wall width of the second wall smaller than 40 μm, it is possible to increase the crosstalk component from the first ultrasonic transmitter toward the second ultrasonic transmitter. Thus, it is possible to further reduce the crosstalk from the first ultrasonic transmitter to the ultrasonic receiver.

In the ultrasonic device according to the first aspect, a dimension of the wall from the vibrating plate to an end surface at an opposite side to the vibrating plate may be no larger than 90 μm.

In the present aspect, the wall length, which is the dimension from an end surface on the vibrating plate side of the wall to an end surface at the opposite side to the vibrating plate of the wall, is no larger than 90 μm. When the wall width becomes no smaller than 40 μm, by making the wall length no larger than 90 μm, the smaller the wall length becomes, the more the crosstalk is reduced. Therefore, by making the wall length of the first wall no larger than 90 μm, it is possible to reduce the crosstalk from the first ultrasonic transmitter to the ultrasonic receiver.

Further, when the wall width is smaller than 40 μm, the change in the crosstalk ratio due to the difference in wall length is extremely small. Therefore, when making the wall width of the second wall smaller than 40 μm, the crosstalk component from the first ultrasonic transmitter to the ultrasonic receiver is reduced, and the crosstalk component from the first ultrasonic transmitter to the second ultrasonic transmitter is increased. Therefore, it is possible to further reduce the crosstalk from the first ultrasonic transmitter to the ultrasonic receiver.

An ultrasonic device according to a second aspect of the present disclosure includes a vibrating plate, a protective member having a protruding part bonded to the vibrating plate and configured to divide the vibrating plate into a plurality of vibrating sections, and vibrators disposed in the respective vibrating sections of the vibrating plate, wherein the plurality of vibrating sections includes a fourth vibrating section, a fifth vibrating section adjacent to the fourth vibrating section via a first protruding part, and a sixth vibrating section adjacent to the fourth vibrating section via a second protruding part, the fourth vibrating section and the vibrator disposed in the fourth vibrating section constitute a third ultrasonic transmitter configured to transmit an ultrasonic wave, the fifth vibrating section and the vibrator disposed in the fifth vibrating section constitute an ultrasonic receiver configured to receive an ultrasonic wave, the sixth vibrating section and the vibrator disposed in the sixth vibrating section constitute a fourth ultrasonic transmitter configured to transmit an ultrasonic wave, and a width of the first protruding part from the fourth vibrating section to the fifth vibrating section is larger than a width of the second protruding part from the fourth vibrating section to the sixth vibrating section.

In the present aspect, since the width (the protruding part wall width) of the first protruding part from the fourth vibrating section to the fifth vibrating section, and the protruding part wall width of the second protruding part are different from each other, due to the principle of antiresonance, the crosstalk component from the third ultrasonic transmitter toward the ultrasonic receiver is reflected by the first wall. Further, since the protruding part wall width of the first protruding part is larger than the protruding part wall width of the second protruding part, the crosstalk component from the third ultrasonic transmitter to the ultrasonic receiver becomes smaller than the crosstalk component from the third ultrasonic transmitter to the fourth ultrasonic transmitter. Thus, it is possible to suppress the crosstalk from the third ultrasonic transmitter to the ultrasonic receiver. Further, in the present aspect, since there is no need to provide a concave groove or the like to the substrate, the strength reduction of the substrate does not occur, and the configuration of the ultrasonic device is not complicated as well. In other words, in the present aspect, similarly to the first aspect, it is possible to suppress the crosstalk while preventing the strength reduction of the substrate with the simple configuration.

In the ultrasonic device according to the second aspect, the width of the first protruding part from the fourth vibrating section to the fifth vibrating section may be no smaller than 40 μm, and the width of the second protruding part from the fourth vibrating section to the sixth vibrating section may be smaller than 40 μm.

When transmitting the ultrasonic wave from the ultrasonic transmitter, in the relationship between the protruding part wall width of the protruding part surrounding the ultrasonic transmitter and the crosstalk from the ultrasonic transmitter to another ultrasonic transmitter or the ultrasonic receiver, the amplitude of the crosstalk decreases as the protruding part wall width increases. On this occasion, taking the point at which the protruding part wall width is 40 μm as a change point, when the protruding part wall width is no smaller than 40 μm, the amplitude of the crosstalk decreases as the protruding part wall width increases, but the reduction amount is small. In contrast, when the protruding part wall width is lower than 40 μm, the smaller the protruding part wall width becomes, the higher the amplitude of the crosstalk becomes, and at the same time, the change in the amplitude becomes rapid. Therefore, by making the protruding part wall width of the first protruding part no smaller than 40 μm, it is possible to reduce the crosstalk component from the third ultrasonic transmitter toward the ultrasonic receiver, and by making the protruding part wall width of the second protruding part smaller than 40 μm, it is possible to increase the crosstalk component from the third ultrasonic transmitter toward the fourth ultrasonic transmitter. Thus, it is possible to further reduce the crosstalk from the third ultrasonic transmitter to the ultrasonic receiver.

In the ultrasonic device according to the second aspect, the protective member may include a base part opposed to the vibrating plate, the protruding part may be disposed so as to protrude from the base part toward the vibrating plate, and a dimension of the protruding part from the vibrating plate to the base part may be no larger than 90 μm.

In the present aspect, the protruding part wall length as the dimension of the protruding part from the vibrating plate to the base part is no larger than 90 μm. When the protruding part wall width becomes no smaller than 40 μm, by making the protruding part wall length no larger than 90 μm, the smaller the wall length becomes, the more the crosstalk is reduced. Therefore, by making the protruding part wall length of the first protruding part no larger than 90 μm, it is possible to reduce the crosstalk from the third ultrasonic transmitter to the ultrasonic receiver.

Further, when the protruding part wall width is smaller than 40 μm, the change in the crosstalk ratio due to the difference in protruding part wall length is extremely small. Therefore, when making the protruding part wall width of the second protruding part smaller than 40 μm, irrespective of the protruding part wall length, the crosstalk component from the third ultrasonic transmitter to the ultrasonic receiver is reduced, and the crosstalk component from the third ultrasonic transmitter to the fourth ultrasonic transmitter is increased. From the reason described hereinabove, it is possible to further reduce the crosstalk from the third ultrasonic transmitter to the ultrasonic receiver.

What is claimed is:

1. An ultrasonic device, comprising:

a substrate having a plurality of opening parts, and a plurality of walls disposed between the plurality of opening parts adjacent to each other;

a vibrating plate configured to close the plurality of opening parts; and a plurality of vibrators on the vibrating plate at positions overlapping the plurality of opening parts when viewed from a stacking direction of the substrate and the vibrating plate, wherein the plurality of vibrators includes a first vibrator, a second vibrator, and a third vibrator, the plurality of opening parts includes a first opening part, a second opening part adjacent to the first opening part via a first wall of the plurality of walls, and a third opening part adjacent to the first opening part via a second wall of the plurality of walls, a first vibrating section configured to close the first opening part and the first vibrator disposed in the first vibrating section constitute a first ultrasonic transmitter configured to transmit an ultrasonic wave, a second vibrating section configured to close the second opening part and the second vibrator disposed in the second vibrating section constitute an ultrasonic receiver configured to receive an ultrasonic wave, a third vibrating section configured to close the third opening part and the third vibrator disposed in the third vibrating section constitute a second ultrasonic transmitter configured to transmit an ultrasonic wave, and a width of the first wall from the first opening part that overlaps the first vibrating section to the second opening part that overlaps the second vibrating section is larger than a width of the second wall from the first opening part to the third opening part that overlaps the third vibrating section, wherein the width of the first wall from the first opening part to the second opening part is no smaller than 40 μm, and the width of the second wall from the first opening part to the third opening part is smaller than 40 μm, and a wall length of each of the plurality of walls from the vibrating plate to an end surface at an opposite side to the vibrating plate is no larger than 90 μm.

2. An ultrasonic device, comprising:

a vibrating plate;

a protective member having a protruding part bonded to the vibrating plate and configured to divide the vibrating plate into a plurality of vibrating sections; and a plurality of vibrators disposed in respective vibrating sections of the plurality of vibrating sections of the vibrating plate, wherein the plurality of vibrating sections includes a fourth vibrating section, a fifth vibrating section adjacent to the fourth vibrating section via a first protruding part, and a sixth vibrating section adjacent to the fourth vibrating section via a second protruding part, the plurality of vibrators includes a fourth vibrator, a fifth vibrator, and a sixth vibrator, the fourth vibrating section and the fourth vibrator disposed in the fourth vibrating section constitute a third ultrasonic transmitter configured to transmit an ultrasonic wave, the fifth vibrating section and the fifth vibrator disposed in the fifth vibrating section constitute an ultrasonic receiver configured to receive an ultrasonic wave, the sixth vibrating section and the sixth vibrator disposed in the sixth vibrating section constitute a fourth ultrasonic transmitter configured to transmit an ultrasonic wave, a width of the first protruding part from the fourth vibrating section to the fifth vibrating section is larger than a width of the second protruding part from the fourth vibrating section to the sixth vibrating section, wherein the width of the first protruding part from the fourth vibrating section to the fifth vibrating section is no smaller than 40 μm, and the width of the second protruding part from the fourth vibrating section to the sixth vibrating section is smaller than 40 μm, the protective member includes a base part opposed to the vibrating plate, the protruding part is disposed so as to protrude from the base part toward the vibrating plate, and a dimension of the protruding part from the vibrating plate to the base part is no larger than 90 μm.

* * * * *